United States Patent [19]

Hara et al.

[11] Patent Number: 5,051,587
[45] Date of Patent: Sep. 24, 1991

[54] RADIATION IMAGE READ-OUT METHOD

[75] Inventors: Shoji Hara; Satoshi Arakawa; Masamitsu Ishida, all of Kanagawa, Japan

[73] Assignee: Fuji Photo Film Co. Ltd., Kanagawa, Japan

[21] Appl. No.: 492,034

[22] Filed: Mar. 12, 1990

[30] Foreign Application Priority Data

Mar. 13, 1989 [JP] Japan .................................. 1-60158
Mar. 13, 1989 [JP] Japan .................................. 1-60159

[51] Int. Cl.$^5$ ............................................. G01N 23/04
[52] U.S. Cl. ............................... 250/327.2; 250/484.1
[58] Field of Search ............... 250/327.2 C, 327.2 F, 250/327.2 G, 484.1 B; 382/22, 19, 48; 358/284, 383, 282

[56] References Cited

U.S. PATENT DOCUMENTS

| | | |
|---|---|---|
| 4,258,264 | 3/1981 | Kotera et al. . |
| 4,276,473 | 6/1981 | Kato et al. . |
| 4,284,889 | 8/1981 | Kato et al. ................ 250/327.2 G |
| 4,315,318 | 2/1982 | Kato et al. . |
| 4,387,428 | 6/1983 | Ishida et al. . |
| 4,952,807 | 8/1990 | Adachi ...................... 250/484.1 B |

FOREIGN PATENT DOCUMENTS

| | | |
|---|---|---|
| 56-11395 | 2/1981 | Japan . |
| 61-80235 | 4/1986 | Japan . |
| 61-238045 | 10/1986 | Japan . |

*Primary Examiner*—Jack I. Berman
*Assistant Examiner*—Richard Hanig
*Attorney, Agent, or Firm*—Sughrue, Mion, Zinn, Macpeak & Seas

[57] ABSTRACT

A radiation image read-out method comprises the steps of exposing a stimulable phosphor sheet, on which a radiation image having a background region has been stored, to stimulating rays which cause the stimulable phosphor sheet to emit light in proportion to the amount of energy stored thereon during its exposure to radiation, and detecting the emitted light in order to obtain an image signal representing the radiation image. The shape and location of the background region are determined in advance, and only the area outside of the background region on the stimulable phosphor sheet is exposed to stimulating rays. Light emitted from the area outside of the background region is detected and converted into an image signal. Alternatively, after the shape and location of the background region are determined, the background region is erased. Thereafter, the stimulable phosphor sheet is exposed to stimulating rays, and light emitted by the stimulable phosphor sheet is detected and converted into an image signal.

17 Claims, 3 Drawing Sheets

FIG. 2

RADIATION IMAGE READ-OUT METHOD

BACKGROUND OF THE INVENTION

1. Field of the Invention

This invention relates to a radiation image read-out method for exposing a stimulable phosphor sheet, on which a radiation image having a background region has been stored, to stimulating rays which cause the stimulable phosphor sheet to emit light in proportion to the amount of energy stored thereon during its exposure to radiation, and detecting the emitted light in order to obtain an image signal representing the radiation image.

2. Description of the Related Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted by the stimulable phosphor varies over a wide range and is proportional to the amount of energy stored during its exposure to radiation, it is possible to obtain an image having a desirable density regardless of the energy intensity of the radiation to which the stimulable phosphor sheet was exposed. In order to obtain a desirable image density, an appropriate read out gain is set when the emitted light is being detected with a photoelectric read-out means and converted into an electric signal to be used in the reproduction of a visible image on a recording material, such as photographic film, or a display device such as a CRT.

Figure 3:
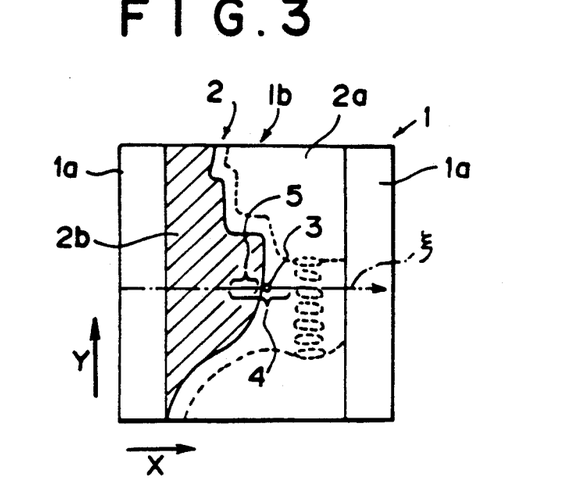
FIG. 3 is a schematic view showing an example of the radiation image stored on a stimulable phosphor sheet.

FIG. 3 is a schematic view showing an example of the radiation image stored on a stimulable phosphor sheet.

With reference to FIG. 3, a radiation image 2 is stored on a stimulable phosphor sheet 1. In the course of recording a radiation image of an object on a stimulable phosphor sheet 1, an irradiation field stop is often used in order to limit the irradiation field to an area smaller than the overall recording region of the stimulable phosphor sheet 1 so that radiation is irradiated only to that portion of the object, which is to be viewed, and part of the stimulable phosphor sheet 1. When the radiation image 2 is recorded on the stimulable phosphor sheet 1, an irradiation field stop is used so that no radiation will be irradiated to peripheral regions 1a, 1a of the stimulable phosphor sheet 1, and the radiation image 2 will be recorded only in a middle region 1b of the stimulable phosphor sheet 1. The radiation image 2 is composed of an object image 2a recorded with radiation, which has passed through the object, and a background region 2b upon which radiation impinges directly without passing through the object. In general, when the radiation image 2 is read out from the stimulable phosphor sheet 1 and an image signal representing the radiation image 2 is obtained, the stimulable phosphor sheet 1 is conveyed in the subscanning direction indicated by the arrow Y, and at the same time a spot of stimulating rays repeatedly scans the stimulable phosphor sheet 1 in the main scanning direction indicated by the arrow X. As a result, the whole area of the stimulable phosphor sheet 1 is scanned with the spot of stimulating rays. Light emitted from every position on the stimulable phosphor sheet 1, which is being scanned with the spot of stimulating rays, is photoelectrically detected and converted into a image signal.

Problems occurring when the spot of stimulating rays scans positions on the stimulable phosphor sheet 1, which lie along a main scanning line $\xi$, will be described hereinbelow with reference to FIG. 3.

The spot of stimulating rays scans the stimulable phosphor sheet 1 rightwardly along the main scanning line $\xi$. When a position 3 in the object image 2a is being scanned with the spot of stimulating rays after the background region 2b has been scanned, an amount of light is emitted from the position 3, which is proportional to the intensity of the stimulating rays and to the amount of energy stored at the position 3 during its exposure to radiation.

However, when a certain position on the stimulable phosphor sheet 1 has already been scanned and the spot of stimulating rays is now being irradiated to a next position, an after-glow continues to emanate for a while from the position which has already been scanned with the spot of stimulating rays. In the background region 2b, a very large amount of energy is stored during exposure of the stimulable phosphor sheet 1 to radiation. Therefore, a very high intensity of light is emitted by the background region 2b when it is exposed to stimulating rays, and a very large amount of after-glow will emanate therefrom. Accordingly, when stimulating rays are being irradiated to the position 3 shown in FIG. 3, an after-glow will be emanating from positions 5 in the background region 2b which have already been exposed to stimulating rays. The after-glow will impinge upon the photodetector together with the light emitted from the position 3 which is being scanned. As a result, even if a small amount of energy is stored at the position 3 which is being scanned (and therefore a low image density should be reproduced at the corresponding position in the visible image), an image signal representing a large amount of stored energy (i.e. representing a high image density) will be obtained from the position 3 because of the after-glow emanating from the background region 2b. When a visible image is reproduced from an image signal thus obtained, the image density of that part of the reproduced visible image corresponding to the part of the object image 2a adjacent the background region 2b becomes high along a line corresponding to the main scanning line ξ. (Such a phenomenon is referred to as the tailing phenomenon.) Consequently, the image quality of the reproduced visible image becomes poor.

Also, in cases where stimulating rays include flare, the flare will impinge upon positions 4 around the position 3 which is being scanned with stimulating rays. The flare causes the positions 4 to emit light. The light emitted from the positions 4 will impinge upon the photodetector together with the light emitted from the position 3 which is being scanned. Therefore, the flare also causes the image quality of the reproduced visible image to become poor. When such flare impinges upon the background region 2b, particularly large adverse effects will occur. As described above, because radiation directly impinges upon the background region 2b without passing through the object when a radiation image 2 is recorded on the stimulable phosphor sheet 1, a very large amount of energy will be stored in the background region 2b. Therefore, even if the amount of flare is very small, a considerable amount of light will be emitted from the background region when it is exposed to the flare. Specifically, even if a small amount of energy is stored at the position 3 which is being scanned (and therefore a low image density should be reproduced at the corresponding position of the visible image), an image signal representing a large amount of stored energy (i.e. representing a high image density) will be obtained from the position 3 because of the light emitted from the background region 2b during its exposure to the flare. Therefore, when a visible image is reproduced from an image signal thus obtained, the tailing phenomenon occurs in the reproduced visible image, and the image quality of the reproduced visible image becomes poor.

SUMMARY OF THE INVENTION

The primary object of the present invention is to provide a radiation image read-out method with which an image signal free of the adverse effects of after-glow is obtained.

Another object of the present invention is to provide a radiation image read-out method with which an image signal free of the adverse effects of after-glow and flare is obtained.

The specific object of the present invention is to provide a radiation image read-out method which prevents the tailing phenomenon, or the like, from occurring and improves the image quality of the reproduced visible image.

Figure 1:
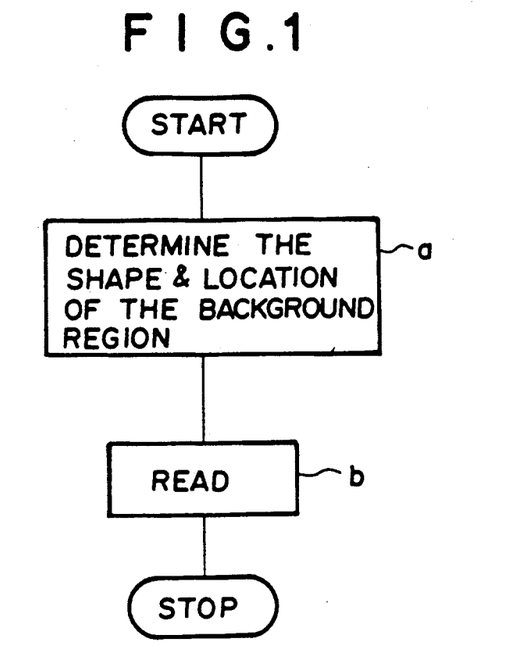
FIG. 1 is a flow chart showing the steps for the first radiation image read-out method in accordance with the present invention.

FIG. 1 is a flow chart showing the steps taken in the first radiation image read-out method in accordance with the present invention.

The present invention provides a first radiation image read-out method for exposing a stimulable phosphor sheet, on which a radiation image having a background region has been stored, to stimulating rays which cause the stimulable phosphor sheet to emit light in proportion to the amount of energy stored thereon during its exposure to radiation, and detecting the emitted light in order to obtain an image signal representing the radiation image, the radiation image read-out method comprising the steps of:

i) determining the shape and location of said background region (step a), and ii) exposing a region outside of said background region on said stimulable phosphor sheet to stimulating rays, and detecting light emitted from said region outside of said background region in order to obtain an image signal (step b).

The term "background region" as used herein means a region upon which radiation impinged directly without passing through an object nor being reflected from the object.

No limitation is imposed on how the shape and location of the background region are determined in step a. For example, as disclosed in U.S. Pat. Application Ser. No. 195,381, a preliminary read-out image signal may be obtained from a preliminary read-out operation (hereinafter simply referred to as the "preliminary readout"), and analyzed. The shape and location of the background region may be determined from the results of an analysis of the preliminary read-out image signal. Specifically, in order for an image signal to be detected accurately, certain factors which affect the image signal must be set in accordance with the dose of radiation delivered to the stimulable phosphor sheet. The preliminary readout is carried out in order to approximately ascertain the radiation image stored on the stimulable phosphor sheet. In the preliminary readout, the stimulable phosphor sheet is scanned with a light beam having a comparatively low energy level. A preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having a high energy level, and the radiation image is read out with the factors affecting the image signal adjusted to appropriate values on the basis of the results of an analysis of the preliminary read-out image signal.

The term "read-out conditions" a used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor, which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Alternatively, as disclosed in, for example, Japanese Unexamined Patent Publication No. 61(1986)-238045, light which is instantaneously emitted by a stimulable phosphor sheet when the stimulable phosphor sheet is exposed to radiation in the course of recording a radiation image thereon may be analyzed. The shape and location of the background region may then be determined in step a from the results of an analysis of the instantaneously emitted light. As another alternative, an image may be reproduced from a preliminary read-out image signal and displayed on a CRT display device. An operator may directly determine the shape and location of the background region from the displayed image, and enter information representing the shape and location of the background region into a radiation image read-out apparatus.

In step b, the whole area of the stimulable phosphor sheet outside of the background region may be exposed to stimulating rays, and light emitted from this area may be detected. Alternatively, only the region inside of the irradiation field but outside of the background region may be exposed to stimulating rays, and light emitted from this region may be detected. In FIG. 3, a middle region lb in which the radiation image 2 is stored corresponds to the region inside of the irradiation field.

In the first radiation image read-out method in accordance with the present invention, stimulating rays are not irradiated to the background region, and no image signal component corresponding to the background region is obtained. Because the background region does not carry information related to a diagnosis or the like, it may, by way of example, be reproduced in the visible image as an area having uniform density. Accordingly, no problem will occur if there is no image signal component corresponding to the background region.

With the first radiation image read-out method in accordance with the present invention, the shape and location of the background region are determined. In a read-out operation, a region outside of the background region on the stimulable phosphor sheet is exposed to stimulating rays, and light emitted from the region outside of the background region is detected. Therefore, there is no risk that a high intensity of after-glow will emanate from the background region, and an image signal free of the adverse effects of after-glow can be obtained. As a result, the tailing phenomenon, or the like, can be prevented from occurring in the reproduced visible image, and the image quality of the reproduced visible image can be kept high.

Figure 5:
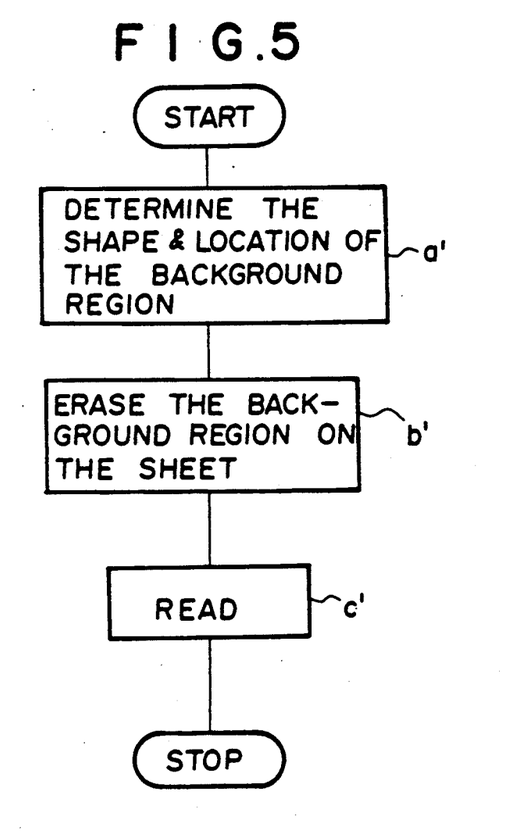
FIG. 5 is a flow chart showing the steps for the second radiation image read-out method in accordance with the present invention.

FIG. 5 is a flow chart showing the steps taken in the second radiation image read-out method in accordance with the present invention.

The present invention also provides a second radiation image read-out method for exposing a stimulable phosphor sheet, on which a radiation image having a background region has been stored, to stimulating rays which cause the stimulable phosphor sheet to emit light in proportion to the amount of energy stored thereon during its exposure to radiation, and detecting the emitted light in order to obtain an image signal representing the radiation image,
the radiation image read-out method comprising the steps of:

i) determining the shape and location of said background region (step a'), ii) erasing the background region from the radiation image stored on said stimulable phosphor sheet (step b'), and thereafter iii) exposing the stimulable phosphor sheet to stimulating rays, and detecting light emitted by the stimulable phosphor sheet in order to obtain an image signal (step c').

The term "erasing" as used herein means releasing the energy which was stored on the stimulable phosphor sheet during its exposure to radiation.

In step a', the shape and location of the background region may be determined in the same manner as in step a of the first radiation image read-out method in accordance with the present invention.

No limitation is imposed on how the background region of the stimulable phosphor sheet is erased in step b'. By way of example, the stimulating rays which are used in the read-out operation for obtaining an image signal may be irradiated only to the background region, which would erase it. (A method in which erasing is carried out with stimulating rays is disclosed in, for example, Japanese Unexamined Patent Publication No. 61(1986)-80235.) Also, a shutter, such as a liquid crystal shutter, with which an aperture can be set arbitrarily, may be located in front of the stimulable phosphor sheet. The region outside of the background region may be masked with the shutter, and light produced by a sodium lamp may be irradiated through the aperture of the shutter to the background region. Alternatively, a LED array comprising LED's situated along a line at intervals corresponding to the width of the picture elements on the stimulable phosphor sheet may be used to irradiate only the background region.

By the time step c' is performed, the background region has already been erased. Therefore, the read-out operation may be carried out on the whole area of the stimulable phosphor sheet. Alternatively, stimulating rays may be irradiated to the area outside of the background region (for example, to the object image), and light emitted from the region outside of the background region may be detected.

Because the background region is erased in step b', image signal components accurately representing the information stored in the background region are not obtained. However, because the background region does not carry information related to a diagnosis, or the like, it may, by way of example, be reproduced in the visible image as an area having uniform density. Accordingly, no problem will occur if image signal components accurately representing the information stored in the background region are not obtained.

With the second radiation image read-out method in accordance with the present invention, the shape and location of the background region are determined, and the background region is erased. Thereafter, the radiation image is read out from the stimulable phosphor sheet. Therefore, there is no risk that a high intensity of after-glow will emanate from the background region. Also, there is no risk that a high intensity of light will be emitted from the background region when it is exposed to flare from the stimulating rays. Accordingly, an image signal free of the adverse effects of after-glow and flare can be obtained. As a result, the tailing phenomenon, or the like, can be prevented from occurring in the reproduced visible image, and the image quality of the reproduced visible image can be kept high.

DESCRIPTION OF THE PREFERRED EMBODIMENTS

The present invention will hereinbelow be described in further detail with reference to the accompanying drawings.

Figure 2:
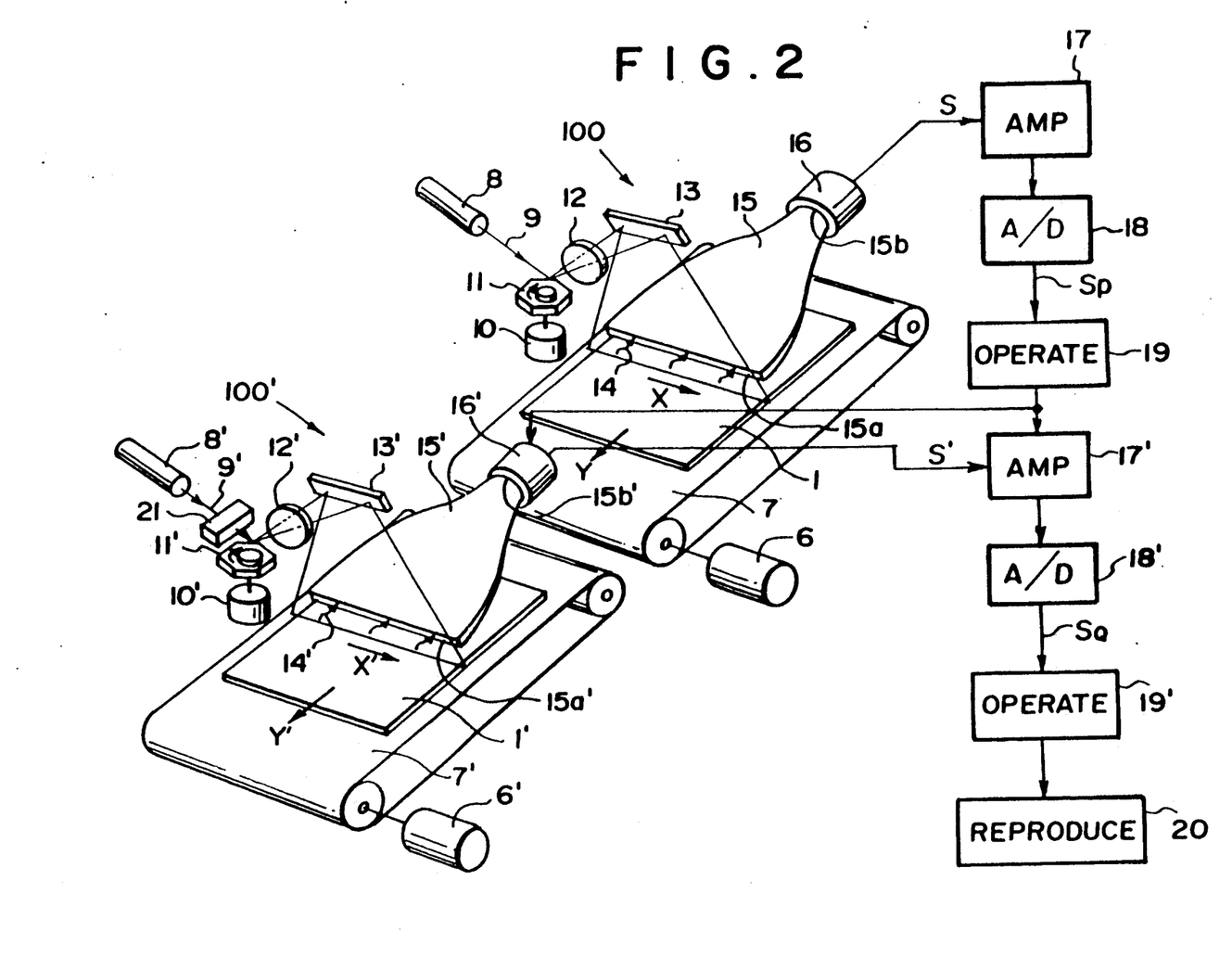
FIG. 2 is a perspective view showing an example of a radiation image read-out apparatus for carrying out an embodiment of the first radiation image read-out method in accordance with the present invention.

FIG. 2 is a perspective view showing an example of a radiation image read-out apparatus for carrying out an embodiment of the first radiation image read-out method in accordance with the present invention. In the radiation image read-out apparatus, a stimulable phosphor sheet is used, and a preliminary readout is carried out.

With reference to FIG. 2, a stimulable phosphor sheet 1 on which a radiation image has been stored is placed at a predetermined position in a preliminary read-out section 100 which carries out a preliminary readout by scanning the stimulable phosphor sheet 1 with a light beam having a low energy level, thereby releasing only part of the energy from the stimulable phosphor sheet 1, which energy was stored during its exposure to radiation. The stimulable phosphor sheet 1 is conveyed in a sub-scanning direction indicated by the arrow Y by a sheet conveyance means 7, which consists of an endless belt or the like and which is operated by a motor 6. A laser beam 9, which has a low energy level, is produced by a laser beam source 8 and is reflected and deflected by a rotating polygon mirror 11, which is quickly rotated by a motor 10 in the direction indicated by the arrow. The laser beam 9 then passes through a converging lens 12 constituted of an $f\theta$ lens or the like. The direction of the optical path of the laser beam 9 is then changed by a mirror 13, and the laser beam 9 impinges upon the stimulable phosphor sheet 1 and scans it in a main scanning direction indicated by the arrow X, which direction is approximately normal to the sub-scanning direction indicated by the arrow Y. When the stimulable phosphor sheet 1 is exposed to the laser beam 9, the exposed portion of the stimulable phosphor sheet 1 emits light 14 in a amount proportional to the amount of energy stored thereon during its exposure to radiation. The emitted light 14 is guided by a light guide member 15 and photoelectrically detected by a photomultiplier 16. The light guide member 15 is made from a light guiding material such as an acrylic plate and has a linear light input face 15a, positioned so that it extends along the main scanning line on the stimulable phosphor sheet 1, and a ring-shaped light output face 15b, positioned so that it is in close contact with a light receiving face of the photomultiplier 16. The emitted light 14, which has entered the light guide member 15 at its light input face 15a, is guided through repeated total reflection inside of the light guide member 15, emanates from the light output face 15b, and is received by the photomultiplier 16. In this manner, the amount of the emitted light 14, which amount represents the radiation image, is converted into an electric signal by the photomultiplier 16.

An analog output signal S generated by the photomultiplier 16 is logarithmically amplified by a logarithmic amplifier 17, and digitized by an A/D converter 18 into a preliminary read-out image signal SP. The level of the preliminary read-out image signal SP is proportional to the logarithmic value of the intensity of the light emitted by each position on the stimulable phosphor sheet 1.

In the preliminary readout, read-out conditions, such as the voltage applied to the photomultiplier 16 or the amplification factor of the logarithmic amplifier 17, are adjusted so that image information can be detected accurately even if the amount of energy stored on the stimulable phosphor sheet 1 during its exposure to radiation varies over a wide range.

The preliminary read-out image signal SP obtained in the manner described above is fed into an operation means 19. The operation means 19 determines the shape and location of a background region and calculates the read-out conditions for the final readout, which will be described later, on the basis of the preliminary read-out image signal SP.

Figure 4:
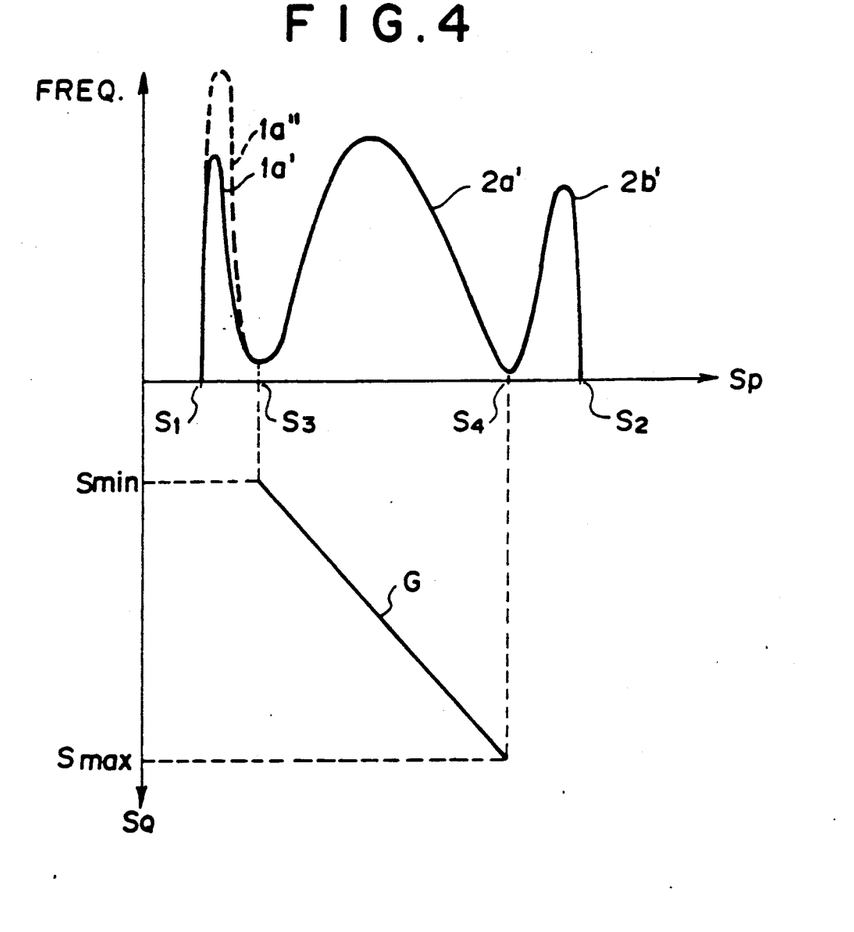
FIG. 4 is a graph showing the probability density function of a preliminary read-out image signal obtained from the whole area of the stimulable phosphor sheet shown in FIG. 3.

FIG. 3 is a schematic view showing a radiation image 2 stored on the stimulable phosphor sheet 1. FIG. 4 is a graph showing the probability density function of a preliminary read-out image signal SP obtained from the whole area of the stimulable phosphor sheet 1 shown in FIG. 3.

In FIG. 4, the left part 1a' of the curve represents the relative frequency of occurrence of the image signal components of the preliminary read-out image signal SP falling within the range of S1 to S3. These image signal components are obtained from the peripheral regions 1a, 1a of the stimulable phosphor sheet 1 shown in FIG. 3. The peripheral regions 1a, 1a are regions outside of the irradiation field, and no radiation impinges thereupon during the recording of the radiation image 2. Therefore, the values of the preliminary readout image signal SP detected from the peripheral regions 1a, 1a are small. A middle part 2a' of the curve in FIG. 4 represents the relative frequency of occurrence of the image signal components of the preliminary readout image signal SP falling within the range of S3 to S4. The middle part 2a' corresponds to the object image 2a shown in FIG. 3, which is related to a diagnosis or the like. A right part 2b' of the curve in FIG. 4 represents the relative frequency of occurrence of the image signal components of the preliminary read-out image signal SP falling within the range of S4 to S2. Part 2b' corresponds to the background region 2b shown in FIG. 3. The values of the image signal components of the preliminary read-out image signal SP detected from the background region 2b are large, and therefore part 2b' is on the right side of the curve in FIG. 4. When part 2b', which corresponds to the background region 2b, is found from an analysis of the preliminary read out image signal SP, it becomes possible to find from which part of the stimulable phosphor sheet 1 the image signal components of the preliminary read-out image signal SP having values falling within the range of S4 to S2 were obtained. Therefore, it is possible to determine the shape and location of the background region 2b on the stimulable phosphor sheet 1.

Based on the preliminary read-out image signal SP, the operation means 19 determines the shape and location of the background region 2b in the manner described above. Also, the operation means 19 determines the shape and location of the middle region 1b (i.e. the irradiation field) on the stimulable phosphor sheet, in which region the radiation image 2 is stored. Specifically, in the same manner as when the shape and location of the background region 2b were determined, the operation means 19 finds from which part of the stimulable phosphor sheet 1 the image signal components of the preliminary read-out image signal SP corresponding to part 1a' were obtained. Thereafter, the operation means 19 determines that the area of the stimulable phosphor sheet 1 not corresponding to part 1a' (i.e. the area not including the peripheral regions 1a, 1a shown in FIG. 3) is the middle region 1b (i.e. the irradiation field).

In the manner described above, the operation means 19 discriminates the peripheral regions 1a, 1a carrying no image, the object image 2a in the radiation image 2, and the background region 2b in the radiation image 2 from one another. Thereafter, the operation means 19 sets the read-out conditions for the final readout so that the object image 2a is read out under the best possible conditions during the final readout. Specifically, the read-out conditions for the final readout are set s that during the final readout the image information represented by values of the emitted light signal falling within the rang of S3 to S4 is detected as an image signal SQ having values lying on the straight line G in FIG. 4 (i.e. as the image signal SQ having values falling within the range of the minimum value Smin to the maximum value Smax).

In order to determine the shape and location of the irradiation field (i.e. the middle region 1b), one of various other techniques may be used. For example, the technique disclosed in U.S. Pat. Application Ser. No. 182,685 may be used for this purpose. In the disclosed technique, the contour point of the irradiation field is detected for each of a plurality of radial lines, which extend from a predetermined point located in the region inside of the irradiation field on a stimulable phosphor sheet to edges of the stimulable phosphor sheet, on the basis of image signal components corresponding to picture elements arrayed along each line. Thereafter, the region surrounded by lines connecting the contour points thus found is detected as the irradiation field.

Also, the shape and location of the background region 2b may be determined with one of various techniques other than the technique relying upon the characteristic that the values of the image signal components obtained from the background region 2b are large. By way of example, as disclosed in U.S. Pat. Application Ser. No. 414,230, the shape and location of the background region 2b may be determined with a technique relying upon the characteristic that changes in the values of the image signal components obtained from the background region 2b are small.

A stimulable phosphor sheet 1' on which the preliminary readout has been finished is placed at a predetermined position in the final read-out section 100' shown in FIG. 2 and scanned with a laser beam 9' having an energy level higher than that of the laser beam 9 used during the preliminary readout. At this time, only the area outside of the background region 2b (shown in FIG. 3) on the stimulable phosphor sheet 1' is scanned with the laser beam 9'. The configuration of the final read-out section 100' is nearly the same as that of the preliminary read-out section 100, and therefore elements corresponding to those constituting the preliminary read-out section 100 are numbered with corresponding primed reference numerals in FIG. 2.

Specifically, the laser beam 9' produced by a laser beam source 8' passes through an acousto-optic modulator (AOM) 21. The AOM 21 is capable of quickly turning the laser beam 9' on (i.e. allowing the laser beam 9' to pass therethrough) and turning it off (i.e. preventing the laser beam 9' from passing therethrough). The laser beam 9' which has passed through the AOM 21 is deflected by a rotating polygon mirror 11'. The AOM 21 controls the turning on and off of the laser beam 9' such that the laser beam 9' impinges upon the whole area of the stimulable phosphor sheet 1' except the background region 2b (shown in FIG. 3). Light 14' thus emitted from the exposed area, which does not include the background region 2b, is detected and converted into an analog signal S'. The analog signal S' is logarithmically amplified by a logarithmic amplifier 17' and digitized by an A/D converter 18' into the image signal SQ. During the final readout, the read-out conditions, such as the gain to be set in a photomultiplier 16' and the amplification factor to be set in the logarithmic amplifier 17', are set to values suitable for the object image 2a on the basis of the output generated by the operation means 19. The image signal SQ is fed into an operation means 19', which carries out appropriate image processing on the image signal SQ. After being image processed, the image signal is fed into a reproducing apparatus 20, which reproduces a visible image by use of the image signal.

In the aforesaid embodiments, the preliminary read-out section 100 and the final read-out section 100' are separate from each other. Alternatively, because the configurations of the preliminary read-out section 100 and the final read-out section 100' are approximately identical to each other, a single read-out means may be utilized for performing both the preliminary readout and the final readout. In this case, after being subjected to the preliminary readout wherein a weak light beam is used for the scanning, the stimulable phosphor sheet 1 may be moved back to the position at which image readout is started. Thereafter, the final readout may be carried out using a strong light beam.

In cases where a single read-out means is utilized to perform both the preliminary readout and the final readout, it is necessary to change the intensity of the light beam used in the preliminary readout and the final readout. For this purpose, various methods may be employed; for example, a laser beam source or the like may change the intensity of the light beam, or the intensity of the light beam may be changed with an ND filter, or the like, which is moved into and out of the optical path of the light beam. Alternatively, the diameter of the light beam may be changed, or the speed which the stimulable phosphor sheet is scanned with the light beam in the main scanning direction or in the sub-scanning direction may be changed.

During the final readout, the AOM 21 controls the turning on and off of the laser beam 9' such that the laser beam 9' impinges upon the whole area of the stimulable phosphor sheet 1' except the background region 2b. However, as shown in FIG. 3, the radiation image 2 is stored only in the region inside of the irradiation field (i.e. the middle region 1b). Therefore, the laser beam 9' may be irradiated only to the region (i.e. the object image 2a) inside of the irradiation field but outside of the background region 2b.

Also, in the embodiment described above, the shape and location of the background region 2b are determined from the results of an analysis of the preliminary read-out image signal SP. However, the first radiation image read-out method in accordance with the present invention is also applicable when no preliminary readout is carried out. Additionally, instead of the AOM 21 being used to control the turning on and off of the laser beam 9', any other appropriate means may be employed for this purpose. For example, a semiconductor laser may be employed to produce a laser beam, which serves as stimulating rays, and may be directly controlled in order to turn the laser beam on and off.

As described above, the first radiation image read-out method in accordance with the present invention is applicable widely when a stimulable phosphor sheet, on which a radiation image having a background region has been stored, is exposed to stimulating rays which cause the stimulable phosphor sheet to emit light in proportion to the amount of energy stored thereon during its exposure to radiation, and the emitted light is detected and converted into an image signal representing the radiation image.

An embodiment of the second radiation image read-out method in accordance with the present invention will be described hereinbelow.

In this embodiment, the preliminary readout is carried out in the radiation image read-out apparatus shown in FIG. 2 in the same manner as that described above. Also, in the same manner as that described above, the operation means 19 discriminates the peripheral regions 1a, 1a carrying no image, the object image 2a in the radiation image 2, and the background region 2b in the radiation image 2 from one another, and sets the read-out conditions for the final readout.

Thereafter, the stimulable phosphor sheet 1' on which the preliminary readout has been finished is placed at a predetermined position in the final read-out section 100' shown in FIG. 2 and scanned with a laser beam 9' having an energy level higher than that of the laser beam 9 used during the preliminary readout. At this time, the laser beam 9' is irradiated to the background region 2b (shown in FIG. 3) on the stimulable phosphor sheet 1', which erases the background region 2b.

Specifically, the laser beam 9' produced by the laser beam source 8' passes through the AOM 21 and is then deflected by the rotating polygon mirror 11'. The AOM 21 controls the turning on and off of the laser beam 9' such that the laser beam 9' impinges upon and erases only the background region 2b (shown in FIG. 3) on the stimulable phosphor sheet 1'. Because the background region 2b is erased, during the final readout the image signal components corresponding to part 2b' of the curve shown in FIG. 4 are not obtained. Instead, the image signal components corresponding to part 1a'' of the curve shown in FIG. 4 are obtained because the background region 2b was erased.

After the background region 2b is erased, the direction along which a motor 6' rotates is reversed, and the stimulable phosphor sheet 1' is returned to the position from which normal scanning with the laser beam 9' is to be begun. Thereafter, the stimulable phosphor sheet 1' is again conveyed in the direction indicated by the arrow Y'. At this time, the AOM 21 controls the turning on and off of the laser beam 9' such that the laser beam 9' will impinge only upon the object image 2a (shown in FIG. 3) on the stimulable phosphor sheet 1'. Light 14' thus emitted by the stimulable phosphor sheet 1' is detected and converted into an analog signal S'. The analog signal S' is logarithmically amplified by the logarithmic amplifier 17' and digitized by the A/D converter 18' into the image signal SQ. During the final readout, the read-out conditions, such as the gain to be set in the photomultiplier 16' and the amplification factor to be set in the logarithmic amplifier 17', are set to values suitable for the object image 2a on the basis of the output generated by the operation means 19. The image signal SQ is fed into the operation means 19', which carries out appropriate image processing on the image signal SQ.

In the aforesaid embodiment of the second radiation image read-out method in accordance with the present invention, during the final readout, the AOM 21 controls the turning on and off of the laser beam 9' such that the laser beam 9' impinges only upon the object image 2a on the stimulable phosphor sheet 1'. However, the background region 2b has already been erased. Therefore, the laser beam 9' may be irradiated to the whole area of the radiation image 2, including the erased background region 2b, or to the whole area of the stimulable phosphor sheet 1', and light emitted from the area thus exposed to the laser beam 9' may be detected.

Also, in the aforesaid embodiment of the second radiation image read-out method in accordance with the present invention, the shape and location of the background region 2b are determined from the results of an analysis of the preliminary read-out image signal SP. However, the second radiation image read-out method in accordance with the present invention is also applicable when no preliminary readout is carried out. Additionally, in the aforesaid embodiment of the second radiation image read-out method in accordance with the present invention, the stimulating rays to be used in the final readout (laser beam 9') are utilized in order to erase the background region 2b. However, no limitation is imposed on how the background region 2b is erased.

As described above, the second radiation image read-out method in accordance with the present invention is applicable widely when a stimulable phosphor sheet, on which a radiation image having a background region has been stored, is exposed to stimulating rays which cause the stimulable phosphor sheet to emit light in proportion to the amount of energy stored thereon during its exposure to radiation, and the emitted light is detected and converted into an image signal representing the radiation image.

We claim:

1. A radiation image read out method for exposing a stimulable phosphor sheet, on which a radiation image having a background region has been stored, to stimulating rays which cause said stimulable phosphor sheet to emit light in proportion to the amount of energy stored thereon during its exposure to radiation, and detecting the emitted light in order to obtain an image signal representing the radiation image, said radiation image read-out method comprising the steps of:

i) determining the shape and location of said background region, and ii) exposing a region outside of said background region on said stimulable phosphor sheet to stimulating rays, and detecting light emitted from said region outside of said background region in order to obtain an image signal.

2. A method as defined in claim 1 wherein the shape and location of said background region are determined from a process in which a preliminary read-out operation is carried out in order to approximately ascertain said radiation image, a preliminary read-out image signal obtained from the preliminary read-out operation is analyzed, and the shape and location of said background region are determined from the results of an analysis of the preliminary read-out image signal.

3. A method as defined in claim 1 wherein the shape and location of said background region are determined from a process in which light instantaneously emitted by said stimulable phosphor sheet when said stimulable phosphor sheet is exposed to radiation in the course of recording said radiation image thereon is analyzed, and the shape and location of said background region are determined from the results of an analysis of the instantaneously emitted light.

4. A method as defined in claim 1 wherein the shape and location of said background region are determined from a process in which a preliminary read-out operation is carried out in order to approximately ascertain said radiation image, a visible image is reproduced on a display device from a preliminary readout image signal obtained from the preliminary read-out operation, and an operator directly determines the shape and location of said background region from the displayed image and enters a signal representing the shape and location of said background region into a radiation image read-out apparatus.

5. A method as defined in claim 1 wherein said stimulating rays are a laser beam.

6. A radiation image read-out method for exposing a stimulable phosphor sheet, on which a radiation image having a background region has been stored, to stimulating rays which cause said stimulable phosphor sheet to emit light in proportion to the amount of energy stored thereon during its exposure to radiation, and detecting the emitted light in order to obtain an image signal representing the radiation image, said radiation image read-out method comprising the steps of:

i) determining the shape and location of said background region, ii) erasing said background region from said radiation image stored on said stimulable phosphor sheet, and thereafter iii) exposing said stimulable phosphor sheet to stimulating rays, and detecting light emitted by said stimulable phosphor sheet in order to obtain an image signal.

7. A method as defined in claim 6 wherein the shape and location of said background region are determined from a process in which a preliminary read-out operation is carried out in order to approximately ascertain said radiation image, a preliminary read-out image signal obtained from the preliminary read-out operation is analyzed, and the shape and location of said background region are determined from the results of an analysis of the preliminary read-out image signal.

8. A method as defined in claim 6 wherein the shape and location of said background region are determined from a process in which light instantaneously emitted by said stimulable phosphor sheet when said stimulable phosphor sheet is exposed to radiation in the course of recording said radiation image thereon is analyzed, and the shape and location of said background region are determined from the results of an analysis of the instantaneously emitted light.

9. A method as defined in claim 6 wherein the shape and location of said background region are determined from a process in which a preliminary read-out operation is carried out in order to approximately ascertain said radiation image, a visible image is reproduced on a display device from a preliminary read-out image signal obtained from the preliminary read-out operation, and an operator directly determines the shape and location of said background region from the displayed image and enters a signal representing the shape and location of said background region into a radiation image read-out apparatus.

10. A method as defined in claim 6 wherein said background region is erased with a process in which said stimulating rays are irradiated only to said background region.

11. A method as defined in claim 6 wherein said background region is erased with a process in which a shutter whose aperture can be set arbitrarily is located in front of said stimulable phosphor sheet such that the region outside of said background region is masked, and light produced by a light source is irradiated through the aperture of the shutter to said background region.

12. A method as defined in claim 6 wherein said background region is erased with a process in which a light emitting diode array, comprising light emitting diodes situated along a line at intervals corresponding to the width of picture elements located on said stimulable phosphor sheet, is utilized to irradiate only said background region.

13. A method as defined in claim 6 wherein said stimulating rays are a laser beam.

14. A method for producing an image signal from a stimulable phosphor sheet having a radiation image stored thereon, the radiation image including an object region and a background region, said method comprising the steps of:

(i) determining the location of the background region within the radiation image;

(ii) exposing an exposure region of the stimulable phosphor sheet to stimulating rays, the exposure region corresponding to the radiation image other than the background region;

(iii) detecting light emitted from the stimulable phosphor sheet due to said exposing in step (ii); and (iv) producing the image signal based on the light detected in step (iii).

15. A method as defined in claim 14 wherein said the exposure region is the object region.

16. A method as defined in claim 14 wherein said exposing in step (ii) comprises the steps of:

(a) erasing the radiation image corresponding to the background region; and (b) supplying at least the object region of the radiation image with the stimulating rays.

17. A method as defined in claim 16 wherein said erasing in step (ii) (a) erases the background region and produces an erased background region, and wherein said supplying in step (ii) (b) supplies the object image and the erased background image with stimulating rays.

* * * * *